US009456545B2

(12) United States Patent
Biber

(10) Patent No.: US 9,456,545 B2
(45) Date of Patent: Oct. 4, 2016

(54) AUTONOMOUS IMPLEMENT

(75) Inventor: Peter Biber, Poltringen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/352,443

(22) PCT Filed: Sep. 4, 2012

(86) PCT No.: PCT/EP2012/067163
§ 371 (c)(1),
(2), (4) Date: Apr. 17, 2014

(87) PCT Pub. No.: WO2013/056891
PCT Pub. Date: Apr. 25, 2013

(65) Prior Publication Data
US 2014/0257620 A1 Sep. 11, 2014

(30) Foreign Application Priority Data
Oct. 19, 2011 (DE) .................. 10 2011 084 793

(51) Int. Cl.
*A01D 34/00* (2006.01)
(52) U.S. Cl.
CPC .................................. *A01D 34/008* (2013.01)
(58) Field of Classification Search
CPC .................................................. A01D 34/008
USPC .......................................................... 701/23
See application file for complete search history.

(56) References Cited

U.S. PATENT DOCUMENTS

| 5,444,965 | A | * | 8/1995 | Colens | A01D 34/008 56/10.2 A |
| 6,255,793 | B1 | * | 7/2001 | Peless | A01D 34/008 180/168 |
| 7,053,580 | B2 | * | 5/2006 | Aldred | A47L 9/009 318/580 |
| 7,706,917 | B1 | * | 4/2010 | Chiappetta | G05D 1/0225 700/245 |
| 8,382,906 | B2 | * | 2/2013 | Konandreas et al. | 134/6 |
| 8,634,960 | B2 | * | 1/2014 | Sandin et al. | 700/258 |
| 8,857,137 | B2 | * | 10/2014 | Avnery | 56/10.2 A |
| 8,868,237 | B2 | * | 10/2014 | Sandin et al. | 700/258 |
| 8,930,023 | B2 | * | 1/2015 | Gutmann et al. | 700/258 |
| 9,008,835 | B2 | * | 4/2015 | Dubrovsky et al. | 700/245 |
| 9,026,302 | B2 | * | 5/2015 | Stout | G05D 1/0219 701/25 |
| 2005/0283309 | A1 | * | 12/2005 | Sonoura | G01S 15/89 340/8.1 |
| 2008/0039974 | A1 | * | 2/2008 | Sandin | G05D 1/028 700/258 |
| 2012/0179321 | A1 | * | 7/2012 | Biber | G05D 1/0259 701/25 |
| 2014/0324246 | A1 | * | 10/2014 | Biber | G05D 1/0219 700/302 |
| 2015/0234385 | A1 | * | 8/2015 | Sandin | G05D 1/0265 700/258 |
| 2015/0258693 | A1 | * | 9/2015 | Yazawa | B25J 19/0054 74/490.03 |

FOREIGN PATENT DOCUMENTS

| CN | 101135911 A | 3/2008 |
| DE | 10 2008 011 947 A1 | 9/2009 |
| DE | 10 2008 001 813 A1 | 11/2009 |
| WO | 96/38770 A1 | 12/1996 |
| WO | 2007/091967 A1 | 8/2007 |

OTHER PUBLICATIONS

International Search Report corresponding to PCT Application No. PCT/EP2012/067163, mailed Nov. 26, 2012 (German and English language document) (7 pages).

* cited by examiner

*Primary Examiner* — McDieunel Marc
*Assistant Examiner* — James E Stroud
(74) *Attorney, Agent, or Firm* — Maginot, Moore & Beck LLP

(57) ABSTRACT

An autonomous implement, in particular an autonomous lawnmower, includes at least one computing unit configured to travel over an area to be worked. The computing unit is configured at least partly to automatically initialize relocalization in at least one operating state.

14 Claims, 3 Drawing Sheets

AUTONOMOUS IMPLEMENT

This application is a 35 U.S.C. §371 National Stage Application of PCT/EP2012/067163, filed on Sep. 4, 2012, which claims the benefit of priority to Ser. No. DE 10 2011 084 793.6, filed on Oct. 19, 2011 in Germany, the disclosures of which are incorporated herein by reference in their entirety.

BACKGROUND

An autonomous implement, particularly an autonomous lawnmower, having at least one computation unit, that is provided for the purpose of traveling an area that is to be treated has already been proposed.

SUMMARY

The disclosure is based on an autonomous implement, particularly an autonomous lawnmower, having at least one computation unit, that is provided for the purpose of traveling along an area that is to be treated.

It is proposed that the computation unit is provided for the purpose of initiating relocation at least to some extent automatically in at least one operating state. In this context, an "autonomous implement" is intended to be understood to mean particularly an appliance that accomplishes a task at least to some extent automatically, for example—in particular—automatically begins, automatically ends, and/or automatically selects at least one parameter, such as particularly a length parameter, and/or a turnaround point, etc. With particular preference, the appliance is provided for the purpose of traveling along an area and, in particular, treating the area, such as sweeping the area, vacuuming the area, cleaning the area and/or mowing a lawn situated on the area. In this case, various autonomous implements that appear appropriate to a person skilled in the art are conceivable, such as an autonomous sweeping machine, an autonomous vacuum cleaner or an autonomous swimming pool cleaning machine, etc., but the autonomous implement is particularly formed by an autonomous lawnmower. In addition, a "computation unit" is intended to be understood to mean particularly a unit having an information input, an information processing section and/or an information output section. Advantageously, the computation unit has at least one processor, a memory, input and output means, further electrical components, an operating program, regulatory routines, control routines and/or calculation routines. Preferably, the components of the computation unit are arranged on a shared board and/or advantageously in a shared housing. The computation unit is preferably arranged within a portion of the autonomous implement that is moved in driven fashion over the area to be treated in order to accomplish a task. Alternatively and/or in addition, however, the computation unit could also be arranged outside the portion of the autonomous implement, such as in a remote control and/or in a fixed station. A connection between the portion of the autonomous implement and the computation unit of the autonomous implement can be made particularly via a wireless link. This allows particularly the computation unit of the autonomous implement to be relocated from the portion of the autonomous implement in order to keep down soiling. In addition, this allows a weight of the portion of the autonomous implement to be kept down. In this context, an "area to be treated" is intended to be understood to mean particularly an area that defines a working region. In this context, an "operating state" is intended to be understood to mean particularly a state of the autonomous implement that can arise during operation of the autonomous implement. Various operating states that appear appropriate to a person skilled in the art are conceivable, but these are intended to be understood to mean particularly an unknown change of position and/or particularly preferably a locating error. Furthermore, "relocation" is intended to be understood to mean particularly sensing of a current position following a loss of information for the current position. Preferably, a position in a previous operating state was known.

The inventive embodiment of the autonomous implement advantageously allows a loss of position and/or other disturbing influences to be rectified at least to some extent automatically.

In addition, it is proposed that the computation unit is provided for the purpose of initiating a specific travel maneuver for relocation on the area that is to be treated in at least one operating state. In this context, a "specific travel maneuver" is intended to be understood to mean particularly a travel maneuver with a length of travel that differs at least to some extent from a length of travel when information pertaining to a position is assumed to exist. Advantageously, the length of travel has at least one contiguous subregion that corresponds at least to some extent to an outer edge of an area that is to be treated. With particular preference, the subregion is at least longer than a contiguous subregion of a length of travel along the outer edge of the area that is to be treated when information pertaining to a position is assumed to exist during regular operation. This allows particularly rapid initiation of automatic relocation, from any position.

Furthermore, it is proposed that the autonomous implement has a sensing unit that is provided for detecting at least one sensing element. Preferably, the sensing unit is provided for the purpose of detecting a sensing element that is arranged on an outer border of the area that is to be treated. In this context, a "sensing unit" is intended to be understood to mean particularly a unit that is provided for the purpose of recording at least one characteristic quantity and/or a physical property and preferably at least to some extent processing it, the recording being able to take place actively, such as particularly by producing and emitting an electrical measurement signal, and/or passively, such as particularly by recording a signal. In this context, a "sensing element" is intended to be understood to mean particularly an element that emits at least one signal and/or can be detected by a sensing unit and/or a sensor as a result of a particular quality in order to sense a precise position for the sensing element and/or for at least one subsection of the sensing element. This advantageously allows simple and precise automatic detection by the autonomous implement of an outer edge of the area that is to be treated.

In addition, it is proposed that the computation unit is, in an initial step, provided for the purpose of initiating travel along an outer border of the area that is to be treated and storing, at least to some extent, a sequence of at least punctual border signatures therefrom. In this context, an "initial step" is intended to be understood to mean particularly a step that is performed at least at the beginning of overall operation and/or after a reset process. In addition, in this context, a "sequence" is intended to be understood to mean particularly a succession of information items and/or properties that are separate from one another in time and/or space. In particular, an order depending on an order in time and/or space is advantageous. Furthermore, in this context, a "punctual border signature" is intended to be understood to mean particularly one or more properties of a point in a border profile and/or one or more property changes for a point in the border profile in relation to a preceding point in the border profile. Various border signatures that appear appropriate to a person skilled in the art are conceivable, but these are intended to be understood to mean particularly a distance signature, a visual signature, a surface quality signature, a terrain inclination signature, a change of orientation and/or particularly advantageously an orientation or direction. In this context, a "distance signature" is intended to be understood to mean particularly a signature that at least to some extent comprises a distance from a current point to a reference point. In this case, the reference point may be variable, such as a previous point for the signature from punctual border signatures, or fixed in terms of location, such as a location of a station and/or a starting point for relocation. In addition, in this context, a "visual signature" is intended to be understood to mean particularly a signature that is formed at least to some extent from a visual recording. Various visual recordings that appear appropriate to a person skilled in the art are conceivable, such as particularly recordings by a camera.

The embodiment makes it advantageous and simple to detect at least to some extent an outer edge of the area to be treated.

Furthermore, it is proposed that the computation unit is in a step of relocation, provided for the purpose of initiating a navigation strategy until the sensing unit detects the at least one sensing element. Preferably, the computation unit is, in a step of relocation, provided for the purpose of initiating a navigation strategy until the sensing unit detects the sensing element of the outer border of the area that is to be treated. In this context, a "navigation strategy" is intended to be understood to mean particularly a travel strategy in which arising events, particularly obstacles, have a corresponding maneuver associated with them. Preferably, an aim of a corresponding navigation strategy is particularly to choose variable paths in order to bypass obstacles and reach an outer edge. As a result, it is advantageously possible to run into an outer edge of the area that is to be treated when a position is unknown.

In addition, it is proposed that the computation unit is, in a step of relocation, provided for the purpose of initiating travel at least to some extent along the at least one sensing element that bounds the area that is to be treated and comparing a sequence of at least punctual border signatures that arises therefrom with a stored sequence. The stored sequence is preferably formed by a sequence of punctual border signatures. This allows relocation to be achieved particularly advantageously and autonomously. In addition, it allows particularly rapid relocation to be achieved, particularly because there may be a 100% match between the sequences after just a short run.

In addition or as an alternative, it would be conceivable for the computation unit to be, in a step of relocation, provided for the purpose of initiating travel at least to some extent along the sensing element of the outer border of the area that is to be treated until a base station whose position is known is reached. In this context, a "base station" is intended to be understood to mean particularly a station for the autonomous implement that is provided for the purpose of holding the autonomous implement during an idle phase. Preferably, the station is provided for the purpose of filling an energy store in the autonomous implement. Filling can be effected by means of refueling, changing a source of energy and/or by charging a storage battery, for example. Other methods that appear appropriate to a person skilled in the art are also conceivable, however. With particular preference, the station is arranged in a marginal region of the area that is to be treated and serves as a starting point and/or end point for the portion of the autonomous implement. This allows relocation to be achieved particularly simply.

It is also proposed that the autonomous implement has a locating unit that is provided for the purpose of determining a position of its own at least within the area that is to be treated. In this context, a "locating unit" is intended to be understood to mean particularly a unit that is provided for the purpose of using external influencing variables and/or information to determine a relative position of its own in a reference system and/or in comparison with the reference point. Various locating units that appear appropriate to a person skilled in the art are conceivable, but this is intended to be understood to mean particularly a locating unit in accordance with German laid-open specification DE 10 2008 011 947 A1, which comprises a locating sensor system and a control means. Accordingly, the description of the locating unit in laid-open specification DE 10 2008 011 947 A1 forms part of the present disclosure. As a result, a position can be determined, particularly in an initial phase, in an advantageous and simple manner.

Furthermore, a method using an autonomous implement, particularly using an autonomous implement according to the disclosure, is proposed that is provided for the purpose of traveling along an area that is to be treated. In this case, the autonomous implement, in a step of relocation, searches for a sensing element that bounds the area that is to be treated and then travels at least to some extent along said sensing element, wherein the computation unit produces a sequence of the at least punctual border signatures that arises in the process and compares it with the stored sequence. This allows relocation to be achieved in an advantageous and simple manner. In addition, it allows a position for the autonomous implement to be determined explicitly.

In addition it would also or alternatively be conceivable for the autonomous implement, in an initial step, to travel along inner borders of the area that is to be treated that are bounded by at least one sensing element and that mark obstacles, for example, and for a computation unit to store at least to some extent a sequence of at least punctual border signatures therefrom. If an inner sensing element is now detected in a step of relocation, it is possible to travel along said sensing element at least to some extent, with the computation unit producing a sequence of at least punctual border signatures that arises in the process and comparing said sequence with the at least one stored sequence. This advantageously allows relocation to be achieved rapidly.

BRIEF DESCRIPTION OF THE DRAWINGS

Further advantages result from the following description of the drawings. The drawings show an exemplary embodiment of the disclosure. The drawings, the description and the claims contain numerous features in combination. A person skilled in the art will expediently also consider the features individually and amalgamate them into appropriate further combinations.

In the drawings.

DETAILED DESCRIPTION

Figure 1:
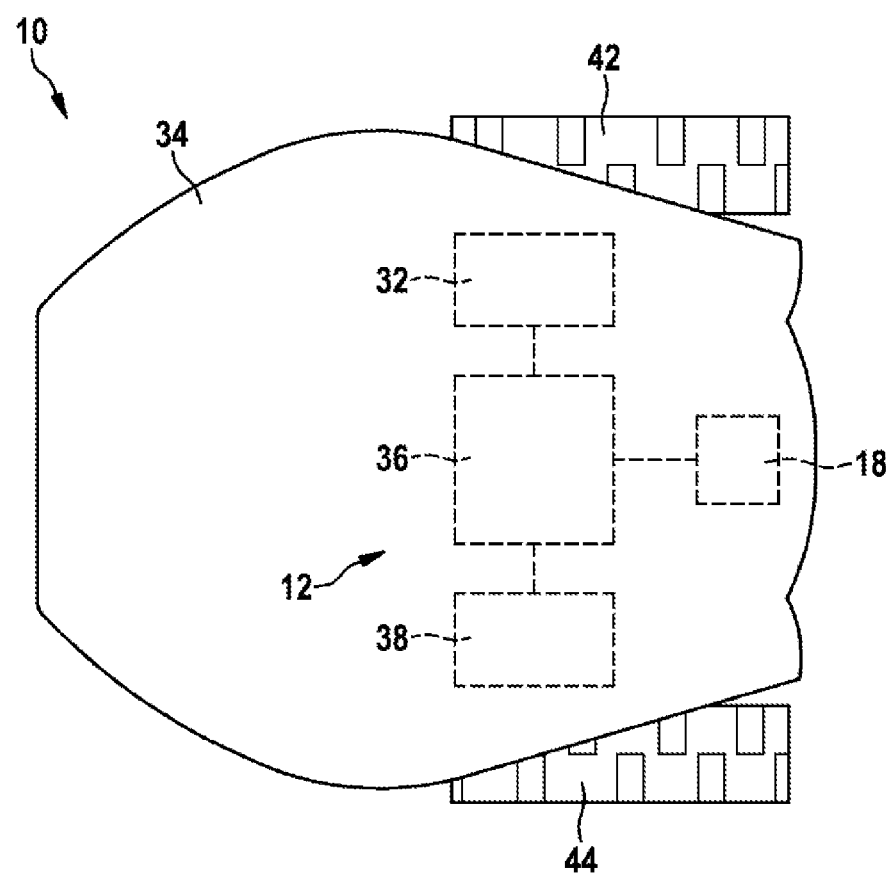
FIG. 1 shows a schematic illustration of an autonomous implement according to the disclosure.
Figure 2:
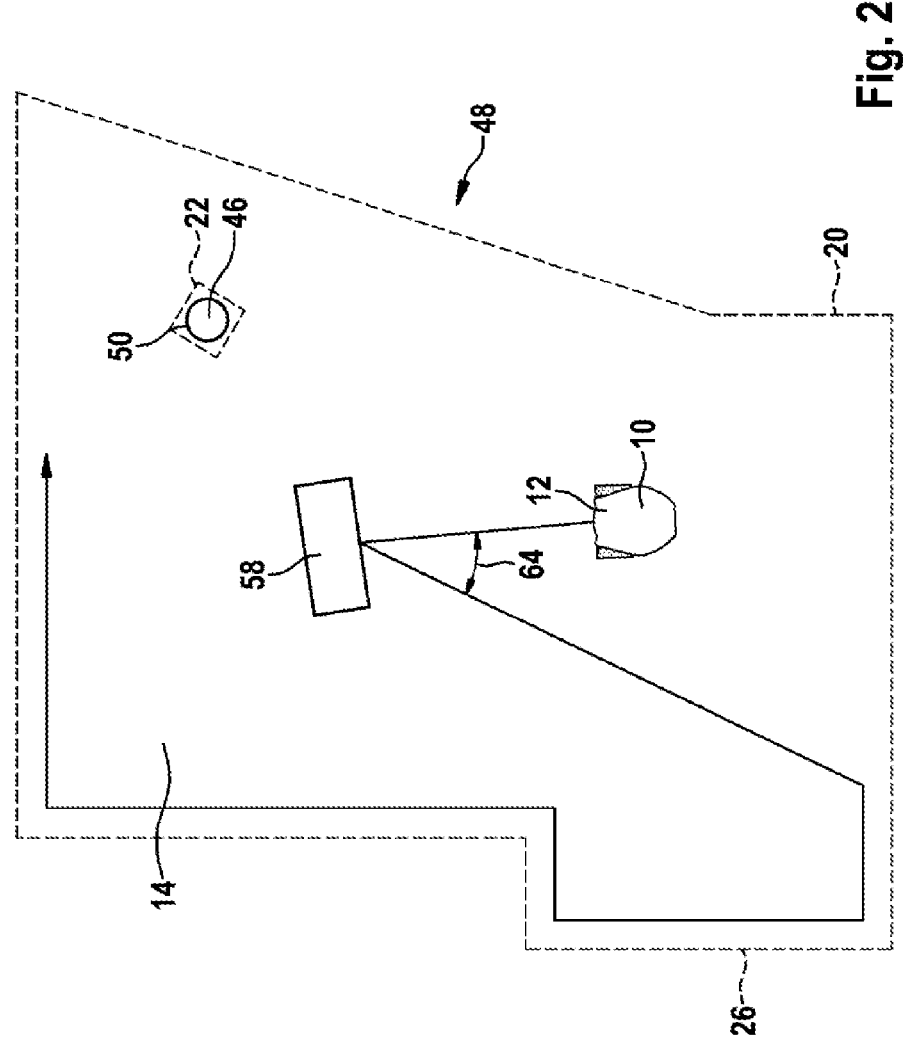
FIG. 2 shows a schematic illustration of the autonomous implement according to the disclosure on an area that is to be treated during relocation.
Figure 3:
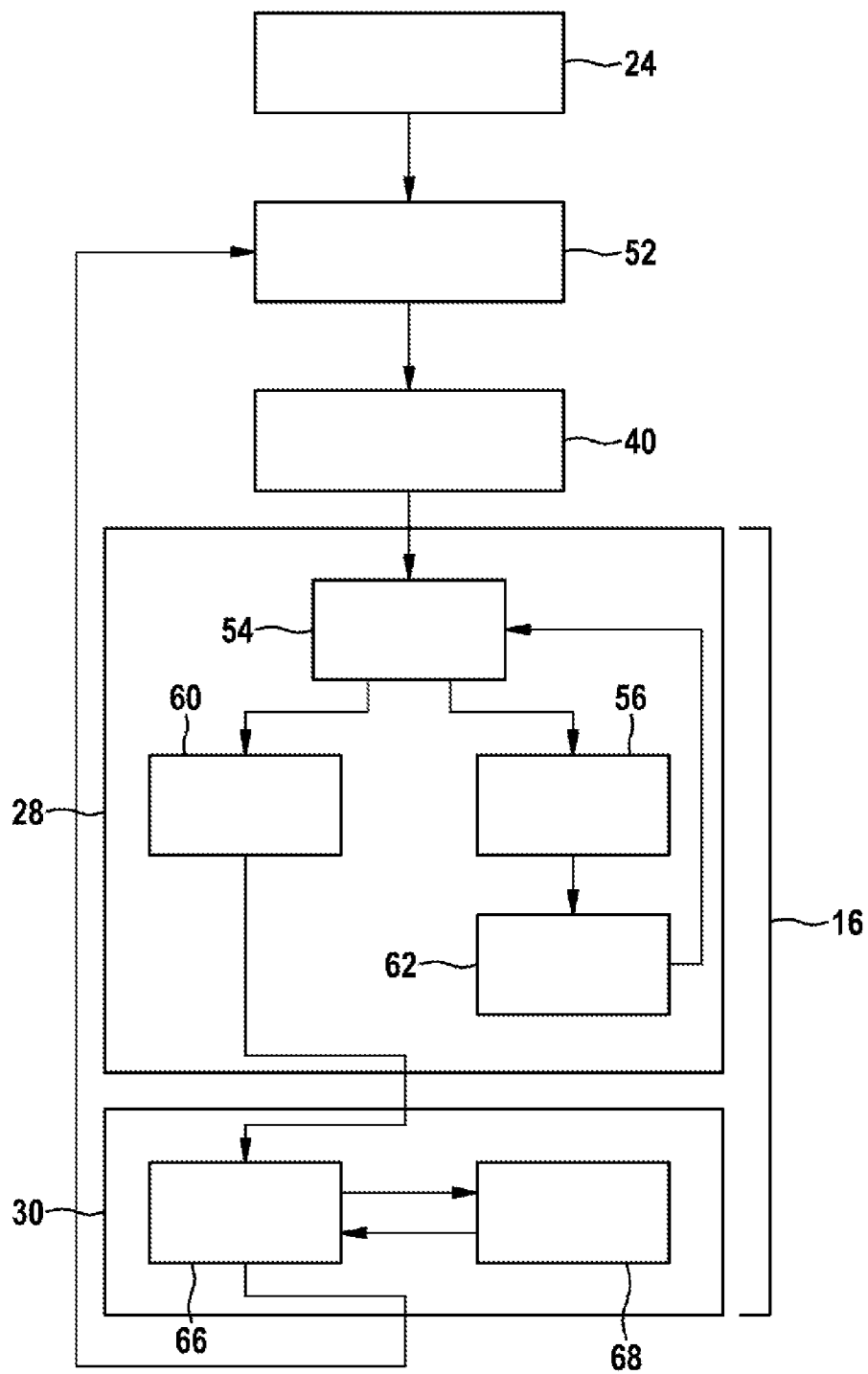
FIG. 3 shows a schematic illustration of a flowchart for the implement according to the disclosure.

FIG. 1 shows a schematic illustration of an autonomous implement 10. The autonomous implement 10 is formed by an autonomous lawnmower. The autonomous implement 10 has a computation unit 12 and is provided for the purpose of traveling along an area 14 that is to be treated. The computation unit 12 is arranged within a housing 34 of the autonomous implement 10. The computation unit 12 comprises a computation core 36 and a memory element 38, the computation core 36 and the memory element 38 being connected by means of a line. The computation unit 12 is provided for the purpose of automatically initiating relocation 16 in an operating state. The computation unit 12 is provided for the purpose of automatically initiating relocation 16 on the area 14 that is to be treated in the event of a locating error. If a locating error is accordingly found in a step 40, relocation 16 is initiated. In addition, the autonomous implement 10 has two drive wheels 42, 44 that are each driven by means of an electric motor, which is not visible further. The drive wheels 42, 44 are arranged on opposite sides of the housing 34 of the autonomous implement 10. The autonomous implement 10 can be controlled by means of separate actuation of the electric motors.

Furthermore, the computation unit 12 is provided for the purpose of initiating a specific travel maneuver for relocation 16 on the area 14 that is to be treated in an operating state. The computation unit 12 is provided for the purpose of initiating a specific travel maneuver for relocation 16 in the event of a locating error.

The autonomous implement 10 has a sensing unit 18 that is provided for the purpose of detecting sensing elements 20, 22. The sensing unit 18 is provided for the purpose of detecting a sensing element 20 that is arranged on an outer border 26 of the area 14 that is to be treated. In addition, the sensing unit 18 is provided for the purpose of detecting a further sensing element 22 that bounds an inner recess 46 in the area 14 that is to be treated. The further sensing element 22 bounds a fixed obstacle 50 that is situated on a lawn 48. In this case, the sensing unit 18 detects a position for a directly proximate region of one of the sensing elements 20, 22 and hence the outer border 26 of the area 14 that is to be treated or the inner recess 46. The sensing unit 18 is arranged in a region of the housing 34 that faces the drive wheels 42, 44, and has a downwardly directed sensor, which is not visible further. The sensing unit 18 is connected to the computation core 36 of the computation unit 12 by means of a line. The area 14 that is to be treated forms a portion of the lawn 48. The sensing elements 20, 22 are formed by a current-carrying sensing wire and are arranged on the lawn 48 on the area 14 that is to be treated.

In addition, the computation unit 12 is provided, in an initial step 24, for the purpose of initiating travel along the outer border 26 of the area 14 that is to be treated and storing a sequence of punctual border signatures therefrom. In the initial step 24, the autonomous implement 10 travels along an outer border 26 of the area 14 that is to be treated once completely, and this involves a border signature being detected and stored by the computation unit 12 at regular intervals. In this case, the border signature is formed by an orientation of the autonomous implement 10 and also by a relative position in relation to a previous border signature and by a relative position in relation to a reference system. The border signatures are stored by the computation unit 12 in the memory element 38 of the computation unit 12 as a sequence of border signatures in accordance with their order in time. In addition, the initial step 24 also involves travel along inner recesses 46. During travel along the inner recesses, a border signature is stored at regular intervals. The border signatures are stored by the computation unit 12 in the memory element 38 of the computation unit 12 as a further sequence of border signatures in accordance with their order in time. In this case, a position for the inner recess 46 relative to the outer border 26 is likewise stored. After the initial step 24, a step 52 of regular operation can begin.

Furthermore, the computation unit 12 is provided, in a step 28 of relocation 16, for the purpose of initiating a navigation strategy until the sensing unit 18 detects one of the sensing elements 20, 22. In the case of relocation 16, the computation unit 12 initiates a navigation strategy for the autonomous implement 10. The navigation strategy is formed by a random strategy. Accordingly, the autonomous implement 10 always travels straight on in a substep 54 of the step 28 of relocation 16 until it either encounters an irregular obstacle 58 in substep 56 or encounters one of the sensing elements 20, 22 in a substep 60. If the autonomous implement 10 encounters one of the sensing elements 20, 22 in the substep 60, the step 28 of relocation 16 is complete. If the autonomous implement 10 encounters an irregular obstacle 58 in the substep 56, the autonomous implement 10 turns through a variable angle 64 in a further substep 62 and continues to travel straight on. This process is repeated until the autonomous implement 10 encounters one of the sensing elements 20, 22.

The computation unit 12 is provided, in a step 30 of relocation 16, for the purpose of initiating travel at least to some extent along one of the sensing elements 20, 22 that bounds the area 14 that is to be treated and comparing a sequence of at least punctual border signatures that arises therefrom with a stored sequence. In a first substep 66 of the step 30 of relocation 16, the autonomous implement 10 travels at least to some extent along one of the sensing elements 20, 22 that bounds the area 14 that is to be treated. In a second substep 68 of the step 30 of relocation 16, a sequence is produced gradually and compared with the stored sequences. The sensing element 20, 22 may be either the sensing element 20 that is arranged on an outer border 26 of the area 14 that is to be treated or the sensing element 22 that bounds the inner recess 46 of the area 14 that is to be treated. The sequence that arises is compared with both stored sequences. As soon as there is a 100% match with one of the stored sequences, the travel can be terminated.

The autonomous implement 10 has a locating unit 32 that is provided for the purpose of determining a position of its own at least within the area 14 that is to be treated. The locating unit 32 is formed by a locating unit in accordance with German laid-open specification DE 10 2008 011 947 A1, which comprises a locating sensor system and a control means. The locating unit 32 is arranged in a region of the housing 34 that faces the drive wheels 42, 44. The locating unit 32 is connected to the computation core 36 of the computation unit 12 by means of a line.

At the beginning of first operation, the initial step is initiated. The autonomous implement 10 travels along the outer border 26 of the area 14 that is to be treated in the initial step 24. The computation unit 12 stores a sequence of punctual border signatures therefrom. The sequence is stored in the memory element 38 of the computation unit 12. The autonomous implement then travels along the sensing element 22 that bounds an inner recess 46. The computation unit 12 stores a further sequence of punctual border signatures therefrom.

Subsequently, regular operation starts in the next step 52. If a locating error is found during operation in the step 40, the computation unit 12 initiates relocation 16.

In the first step 28 of relocation 16, the computation unit 12 starts random navigation of the autonomous implement 10. This involves the autonomous implement 10 searching for one of the sensing elements 20, 22 that bounds the area 14 that is to be treated. The autonomous implement 10 continues to travel straight on in the first substep 54 until it encounters an obstacle 58 in the substep 56 or the sensing unit 18 detects a sensing element 20, 22 in a substep 60. If the autonomous implement 10 encounters an obstacle 58 in a substep 56, a turn through a variable angle 64 is made in the subset 62. Subsequently, the substep 54 is again executed and the autonomous implement 10 travels straight on again. If the sensing unit 18 detects a sensing element 20, 22 in the substep 60, the step 28 is ended and the step 30 is initiated. In the first substep 66 of the step 30 of relocation 16, the autonomous implement 10 follows the previously detected sensing element 20, 22 using the sensing unit 18. While this is being followed, the computation unit 12 produces a sequence of at least punctual border signatures in a substep 68. In this case, the sequence is compiled gradually. The sequence produced is compared with both stored sequences. As soon as there is a 100% match with one of the stored sequences, the substep 66 is ended and a process in which the autonomous implement 10 follows the sensing element 20, 22 is terminated. Subsequently, a current position for the autonomous implement 10 relative to the reference system is read from the information from the stored matching sequence. The step 52 of regular operation can then be continued.

The invention claimed is:

1. An autonomous implement, comprising:
a sensing unit configured to detect at least one sensing element, the at least one sensing element marking an outer border of an area; and
at least one computation unit operatively connected to the sensing unit and configured to:
in an initial step prior to operation in a first operating state, operate the autonomous implement to travel along the outer border of the area and store in a memory, at least to some extent, a sequence of signature data including border signatures that define the outer border of the area;
operate the autonomous implement in the first operating state to travel along the area to treat the area;
in response to a loss of current position information, operate the autonomous implement in a second operating state to automatically identify the current position information, the current position information corresponding to a position of the autonomous implement within the area;
in the second operating state, operate the autonomous implement to perform a navigation strategy until the sensing unit detects the at least one sensing element; and
in the second operating state, after the sensing unit detects the at least one sensing element, operate the autonomous implement to travel at least to some extent along the outer border of the area and compare a sequence of data corresponding to a current travel path with the stored sequence of signature data that includes the border signatures that define the outer border of the area.

2. The autonomous implement as claimed in claim 1, wherein the navigation strategy is different from travel maneuvers performed in the first operating state to treat the area.

3. The autonomous implement as claimed in claim 1, the at least one computation unit being further configured to:
in the second operating state, operate the autonomous implement to return to the first operating state in response to a match being indicated by the comparison between the sequence of data corresponding to the current travel path and the stored sequence of signature data that includes the border signatures that define the outer border of the area.

4. The autonomous implement as claimed in claim 1, the at least one computation unit being further configured to:
in the second operating state, operate the autonomous implement to return to the first operating state in response to the sensing unit detecting a base station having a known position within the area.

5. The autonomous implement as claimed in claim 1, further comprising a locating unit configured to determine a position of the autonomous implement within the area.

6. A method using an autonomous implement, the autonomous implement including at least one computation unit and a sensing unit a sensing unit configured to detect at least one sensing element, the at least one sensing element marking an outer border of an area, the method comprising:
in an initial step before operating in a first operating state, operating the autonomous implement to travel along the outer border of the area and store in a memory, at least to some extent, a sequence of signature data including border signatures that define the outer border of the area;
operating the autonomous implement in the first operating state to travel along the area to treat the area;
in response to a loss of current position information, operating the autonomous implement in a second operating state to automatically identify the current position information, the current position information corresponding to a position of the autonomous implement within the area; and
in the second operating state, operating the autonomous implement to perform a navigation strategy until the sensing unit detects the at least one sensing element; and
in the second operating state, after the sensing unit detects the at least one sensing element, operating the autonomous implement to travel at least to some extent along the outer border of the area and compare a sequence of data corresponding to a current travel path with the stored sequence of signature data that includes the border signatures that define the outer border of the area.

7. The method as claimed in claim 6, further comprising:
in the second operating state, operating the autonomous implement to return to the first operating state in response to a match being indicated by the comparison between the sequence of data corresponding to the current travel path and the stored sequence of signature data that includes the border signatures that define the outer border of the area.

8. The method as claimed in claim 6, further comprising:
in the second operating state, operating the autonomous implement to return to the first operating state in response to the sensing unit detecting a base station having a known position within the area.

9. The autonomous implement as claimed in claim 1, wherein the autonomous implement is configured as an autonomous lawnmower.

10. The autonomous implement as claimed in claim 1, wherein the sequence of signature data includes a plurality of information items that are each unique in at least one of time and space and define the outer border of the area.

11. The autonomous implement as claimed in claim 10, wherein the border signatures of the sequence of signature data include at least one of (i) a property of a point in a border profile and (ii) a change in a property of a point in the border profile with respect to a preceding point in the border profile.

12. The autonomous implement as claimed in claim 10, wherein the sequence of signature data includes distance signatures, the distance signatures being a distance from a current location to a reference location.

13. The autonomous implement as claimed in claim 10, wherein the sequence of signature data includes visual signatures, the visual signatures being visual recordings.

14. The autonomous implement as claimed in claim 10, wherein the sequence of signature data includes at least one of surface quality signatures, terrain inclination signatures, and orientation signatures.

* * * * *